US005686175A

United States Patent [19]

Möller

[11] Patent Number: 5,686,175

[45] Date of Patent: Nov. 11, 1997

[54] RECYCLED WOOD PRODUCT WITH PLATELETS

[76] Inventor: Achim Möller, Max-Sachs-Str. 32, D-01157 Dresden, Germany

[21] Appl. No.: 416,759

[22] Filed: Jul. 25, 1995

[30] Foreign Application Priority Data

Oct. 17, 1992 [DE] Germany ........................ 42 34 871.48

[51] Int. Cl.$^6$ ................................ B32B 5/16; B32C 17/00

[52] U.S. Cl. ........................... 428/326; 241/36; 241/79.1; 241/84; 241/95; 241/100; 241/271; 241/DIG. 38; 428/903.3

[58] Field of Search ................................ 428/326, 903.3; 241/36, 79.1, 84, 95, 100, 262, 270, 271, DIG. 38

[56] References Cited

U.S. PATENT DOCUMENTS

| | | | |
|---|---|---|---|
| 3,991,459 | 11/1976 | Rapp | 29/252 |
| 4,122,236 | 10/1978 | Holman | 428/453 |
| 4,903,902 | 2/1990 | Hufnagel | 241/84 |
| 5,143,311 | 9/1992 | Laster | 241/280 |

*Primary Examiner*—Hoa T. Le
*Attorney, Agent, or Firm*—Griffin, Butler Whisenhunt & Kurtossy

[57] ABSTRACT

A recycled wood product is formed from wood products originally made from first cut wood. The recycled wood product is formed by removing external fittings, if any, projecting from the original, wood product and thereafter chipping the original wood product into platelets which are thereafter assembled in layers, glued together and then pressed together. Any excess formaldehyde in the original wood product is removed by the addition of urea. Machinery to practice the process includes a chipping tool which chips the original product into platelets as the original wood product is advanced against the chipping tool on a movable support structure.

14 Claims, 8 Drawing Sheets

RECYCLED WOOD PRODUCT WITH PLATELETS

The invention relates to a recycled wood product which finds use in the packing material industry, in furniture and indoor fittings as well as in high-rise and underground construction.

BACKGROUND AND OBJECTS OF THE INVENTION

Wood products made of platelets for the above named utilizations are normally manufactured from prepared original, or first cut, wood of the appropriate qualities. It is also increasingly common, to use wood remains or waste products, like sawdust from original wood, original wood sections, wood veneer pieces or previously used wooden objects (e.g. transport palettes).

In addition to the above named starting materials, but to a small extent, wastes from wood processing are also used. For example this could be edges of wood panels, or sanding dust which results from the sanding of fiber panels. Piece remains are comminuted in accordance with the known technology of chip production; however, this results only in compact particles having short fibers. Such particles have a negative influence on the elasto-mechanical properties of the recycled wood product, glue utilization, and other technological influences. As a result, the utilizable amount of the wood waste in the production of recycled wood products is strongly limited.

Attempts to utilize old furniture parts as starting materials for the production of recycled wood products have foundered because of the differing compositions of the starting materials as well as the presence of foreign substances (synthetic products, laminates and metallic fittings).

Thus, the mechanical comminution of old furniture parts currently occurs through machines such as hackers, shredders, or mills. The object thus pursued is to create pourable particles which can subsequently be burned or stored in dumps.

These known products are however not suited for the production of new recycled wood products.

In addition, burning or dumping are restricted from ecological perspectives despite modern safeguards for burning and dump security.

A further disadvantage in the utilization of old furniture parts to construct new recyclable wood products consists in the occasional presence of extremely high formaldehyde contents.

It is an object of the invention to create a plate-like or spatially formed recycled wood product comprised of partially or completely of recyclable wood panels or wood fiber panels, which has the mechanical properties for the appropriate utilization and which exhibits a raw density of 450 $kg/m^3$ to 1100 $kg/m^3$.

The recycled wood products should also be capable of being manufactured with high productivity and the manufacturing process should be largely automatable.

In addition to the economical production of recycled wood products, the invention also allows for the ecologically sensible disposal of recyclable wood products and waste by providing for their re-utilization.

REPRESENTATION OF THE INVENTION

In accordance with the invention, the object is achieved by, a plate-like or molded recycled wood product suitable for the particular utilization in the furniture industry, or interior furnishings, or in the packing material industry, or in high-rise or underground construction by the production of platelets (9) which overlap one another on opposite sides and which are largely parallel to the surface of the newly created product.

The platelets (9) exhibit an average plate thickness of from 1.0 mm to 8.0 mm.

The relationship between platelet width to platelet thickness is at least from 3:1 to 10:1 and the relationship of platelet length to platelet thickness is from 3:1 to 200:1.

The preferable width of the platelet is from 10 mm to 20 mm at a median platelet size of from 1 $cm^2$ to 25 $cm^2$.

The platelets exhibit a formaldehyde concentration which is reduced from that of the starting materials.

The platelets (9), which can be made from wood fibers or wood panels or their parts, or from similar wastes, or from disposable old furniture parts and the like, exhibit principally the same surface material structure of the wood fibers or wood panels used for their creation.

The platelets (9), which are arranged one above the other, largely mutually, and which overlap like scales, generally in parallel to the surface of the new recycled wood product, are secured to one another with glue in the contact zone between touching elements. The recycled wood product according to the invention is further characterized by a raw density of from 450 $kg/m^3$ to 1100 $kg/m^3$. Dependent upon the intended application, the wall thickness of the resulting product can range from 5.0 to 50 mm, possible to 1000 mm.

The surfaces of the recycled wood product can be arranged loosely and porously, or tightly bound, ground, or glued depending on the desired density and the contemplated use. The recycled wood product thus created exhibits the following advantages:

With a loose product structure and consequent low raw density, the product exhibits an advantageous mass-load bearing capacity compared to the primary starting material (e.g. old furniture panels). This is achieved through numerous hollow spaces which remain in the vicinity of the edges of the platelets.

With a deliberately increased raw density one can achieve high strengths. The platelets (9) utilized for the formation of recycled wood products according to the invention may be reinforced by surface materials from the edges of the starting material which gives the new recycled wood product advantageous strength characteristics.

A further advantage arises from the usefulness of remainder, or secondary, materials which are of low value or the disposal of which is otherwise involved with large efforts. Through the utilization of secondary raw materials these materials are spared their usual disposal through burning or dumping whereby the environment is less stressed and resources utilized in the production of primary original wood products are spared.

The production of the new recycled wood product commences with the preparation of the derived wood product panels which may originate, for example, from dismantled old furniture. If the recyclable wood panels (7) contain fittings, hinges, or similar parts (12) which project above the surface, they are removed, in accordance with the invention, with a separation process that is performed by wedge-like tool pieces (15) which move them out of the way or cut them off at the panel surface (7.1). The apparatus (15) utilized for this purpose exhibits cutting wedges with a wedge angle of from 70° to 90°, the chipping surfaces of which are close to perpendicular to the panel surface (7.1).

Subsequently, the production of the platelets occurs through a process which is characterized in that the recyclable wood product panel (7) is laid on a supporting surface 6 which can be either fixed or movable in the direction of the work. Above the supporting surface 6 there is a wedge like cutting/breaking tool (3: 3.1; 3.2) with a working width which is larger, or the same as, the width of the recyclable wood panel (7). The cutting and breaking tool (3: 3.1: 3.2) performs a translating work motion which is constant, or with a changing work direction, with a working angle of between 35° and 65° with respect to the surface (7.1) of panel 7 in direction toward the support structure 6 until shortly before, or until, contact with this surface. The support structure 6 projects about 3 millimeters beyond (in the direction of transport of the panel 7) the effective working plane (3.6) performed by the cutting edge (3.5) of the cutting/breaking tool (3: 3.1: 3.2). After the complete penetration and severance of the panel 7, the cutting and breaking tool (3, 3.1, and 3.2)) is returned to its starting point. Afterwards the panel is advanced so that the working thickness ($h_e$), measured perpendicular to the direction of the work (W) and to the cut surface, amounts to between 3 millimeters to 30 millimeters.

The wedge angle (β) of the cutting/breaking tool (3, 3.1, and 3.2), measured between the wedge surface (3.3) and the free surface (3.4), (or analogous surfaces such as chipping or chamfered surfaces, or tangents thereto) amounts to between 55° to 95° in the reference measurement plane which is perpendicular to the cutting edge (3.5). The chipping angle (γ) at the cutting and breaking tool (3: 3.1: 3.2), measured between the wedge surface (3.3) (or an analogous surface) and a working plane (EW) which is perpendicular the work direction (W), amounts to between +35° to −10°. The platelets (9) that are thus produced, can subsequently be formed to a desired length and completely separated from one another through otherwise known processors and apparatus such as saws, scissors, impact or breaking apparatus, or drums. This would be desirable in case the platelets are still connected with one another after the above-described process has occurred.

The cutting velocities in accordance with the invention are chosen to be within the realm of the wood working industry, or to be below them.

It has been discovered that the penetration of the cutting/breaking tool (hereinafter simply described as 3) into the panel (7) in the above-describe manner results in a separation and a chipping of platelets (9). The support structure 6 prevents the breakage of the edges of the panel 7 with the projection (V) and thus allows the chipping away of platelets (9) to the last layer. The layer development results from the above-described arrangement of the cutting plane of the material, to the work direction of the apparatus according to the invention, and as a result of the discovered cutting geometry.

As a result of the magnitude of the wedge angle it is also possible to penetrate and separate metal parts (10) which may be located within panel 7.

In the above described processes for production of platelets, a portion (up to 10% by mass) is created as small breakage parts (32), (33) in the form of fine particles, whose measurements are smaller than that of the platelets (9).

In a preferable embodiment of the process, the cutting edge with a wedge angle of from 55° to 95° is attached to a beam-like work carrier (4). The cutting and breaking tool (3) undergoes a work motion with constant, or possibly with changeable working direction (W) during the cutting motion in an angular range from about 35° to 65° with respect to the panel surface (7.1). The chipping angle (γ), measured between the chip surface 3.3 (or an analogous plane) and the reference working plane (EW) which is perpendicular to the work direction (W), is approximately +35° to −10°.

In an otherwise known adjustment or advance mechanism, the chipping depth can be adjusted between 3 millimeters to 30 millimeters. The arrangement further includes a support structure (6) which is opposite the work piece and which underlies the panel 7. The support structure (6) extends at least 3 millimeters beyond the working plane of the knife edges. The working motion of the cutting and breaking tool (3) is so arranged that it is completed when the cutting edges (3.5) approach the plate-like support structure (6), but in any event when it touches the support structure (6).

The panel 7, which is to be processed, is advanced toward the oscillating cutting and breaking tool (3) with a stepping working motion (17) on the support arrangement (6).

In another preferable embodiment, the arrangement for advancing movement is achieved through the effects of gravity on the appropriately located workpiece. To limit the advance motion, a movable advance mechanism, is provided whose motion is synchronized with the motion of the cutting and breaking tool (3).

The relative motions between the cutting and breaking tool (3), recyclable wood panel 7 and the plate-like support structure (6) can be realized in accordance with the working apparatus (crank press, or eccentric press) that is chosen.

BEST MODE FOR PRACTICE OF THE INVENTION

In a further, preferred embodiment of the apparatus to practice the method accordance with the invention, one or more cutting/breaking tool (3) are mounted on the periphery of a rotating work carrier (19), realized in either drum or cylinder form.

The circular motion of this drum, or the rotating cutting/breaking tool (3) is intercepted through a synchronous advancing motion of the advance mechanism of the movable plate-like support structure 6 which is adjusted with the direction of rotation of the work carrier (19) so that the resulting motion is almost a translating work motion. After a complete penetration of the wood panel 7 the support structure (6) is returned to its starting position.

In a further embodiment (FIG. 1*a*) the cutting/breaking tool comprises several, laterally displaced, cutting wedge segments (3.1), (3.2) which are attached to a cutting wedge bar moving in the direction of the advance mechanism. In this particular arrangement, the platelets (9) are produced with laterally spaced notches which—in the appropriate instance—facilitate, or actually create, a separation of the plates which would otherwise be formed along the total width of the panel.

The thickness, as well as the width, of the platelets (9) can be controlled by the adjustment or advance motion of the workpiece and thus the chipping depth can be adjusted. A small working thickness ($h_e$) yields correspondingly small plate-like elements, for the separation of which only a small shear surface has to be overcome. Thus, less power, as well as a reduced penetration depth of the cutting edge (3.5) for the next plate formation is required.

The penetration of the cutting edge (3.5) can be facilitated by lubrication, for example by way of a paraffin or graphite paste, to reduce the force and power demands on the working apparatus. The system for the production of the platelets (9) includes a transportation arrangement for the removal of the platelets as well, if necessary, a breaking station, a cutting station, or an equivalently functioning arrangement for the shortening of the platelets.

After the production of the platelets (9), the formaldehyde emission of the plates is determined with known means, for example, an infrared measuring apparatus (40). Depending upon the measured concentration, the platelets (9) may be treated with an appropriate, otherwise known, process with a urea solution (41) or an equivalently functioning formaldehyde capturing substance. Through these processes the formaldehyde bound in the platelets is partially dissolved and its concentration can be lowered to an uncritical value.

The thusly produced platelets (9) advance for further processing to a recycled wood product in accordance with the invention after a possible intermediate step to a known gluing arrangement, such as a glue drum, and are glued with a typical organic glue such as urea-formaldehyde rosin in the amount of 3%. To achieve an increase of strength, a higher glue content is possible. The supplemental addition of a strengthening impregnation material, a fire retardant material, or similar substance, can result in further improvements to the product. Instead of an organic glue it is also possible to use, for certain cases, a known inorganic binder such as cement, or gypsum.

Subsequently, after a possible intermediate station, the formation of a layered structure through known techniques, such as scattering, can be achieved, whereby the platelets are scattered statistically to arrange themselves, like overlapping scales, essentially parallel to the surface of the new product, above or below one another, ahead or behind one another. To this end, machines common to the manufacture of chip panels are used, such as for example a horizontal discharge bin followed by separating rollers in which the described arrangement of the platelets (9) is adjusted to create a uniform surface.

The resulting mat is then pressed with known hot presses and in accordance with other technological parameters common to the production of the derived timber products.

The small fine particles (32), (33) resulting from the platelet production can be further processed into other forms of recycled wood products. It is however also possible to utilize these particles (32), (33) together with the platelets (9)—either in a uniform mix or in particular layers.

A significant technological and energy efficient advantage is realized because in general the drying of the platelets (9), from which the mat is built, is eliminated because the starting material (remains or waste from wood chips and wood fiber panels) already exhibit sufficient dryness.

THE DRAWINGS

Examples of the invention are more clearly described with reference to the drawings in which:

FIG. 1(*a*) shows a detail of FIG. 1 illustrating the lateral placement of the segments of the working tool, FIG. 1(*b*) shows a detail of FIG. 1 illustrating the cutting process of the cutting/breaking tool.

FIG. 3(*a*) shows a detail of FIG. 3 illustrating the cutting process with a rotating cutter/breaking tool.

DETAILED DESCRIPTION

Figure 1:
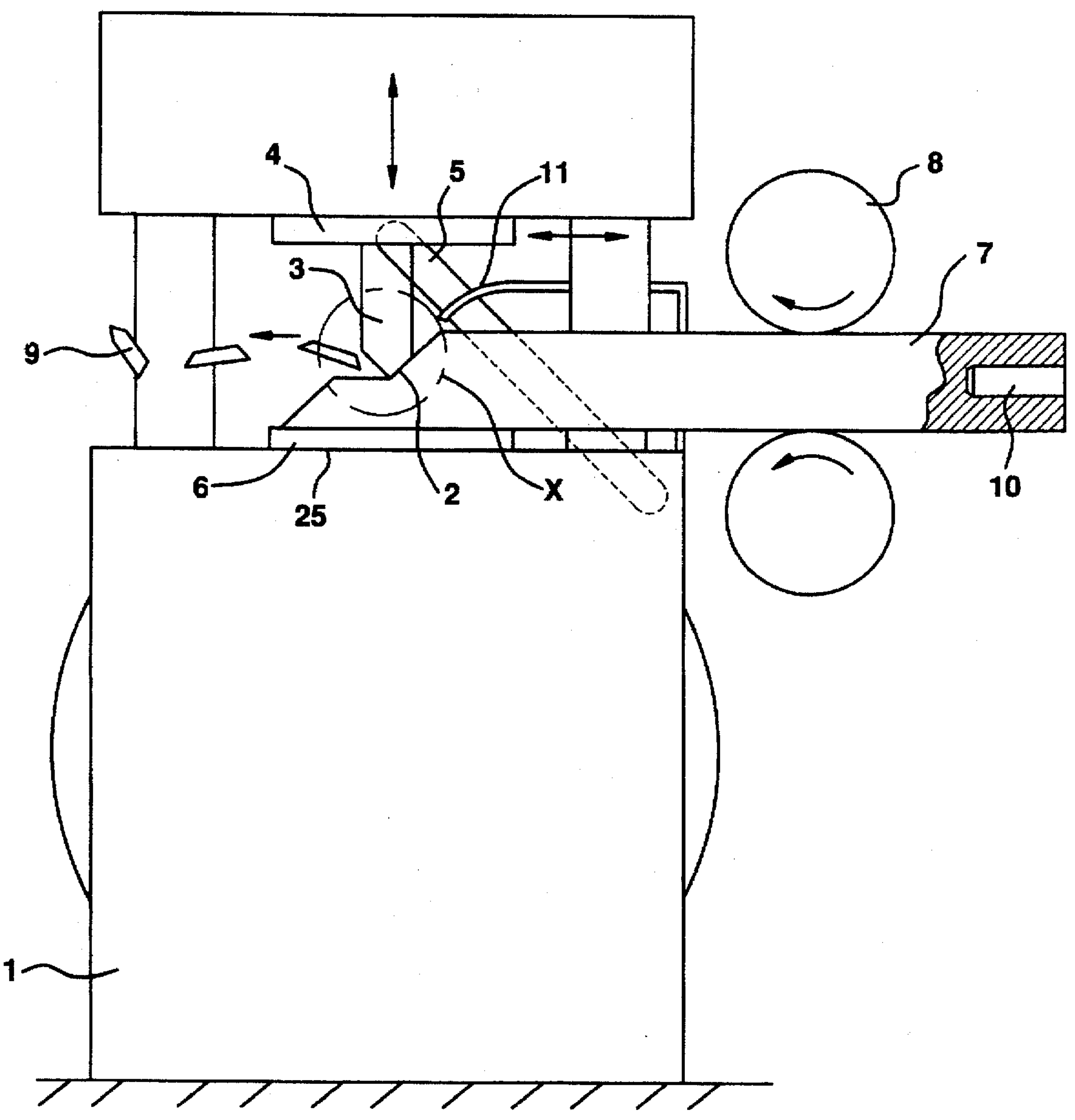
FIG. 1 shows an eccentric press with a work piece advancement mechanism for the production of platelets.
Figure 1A:
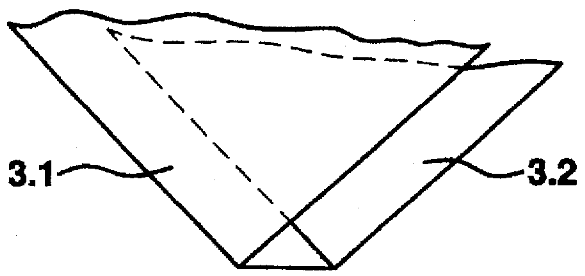
Figure 1B:
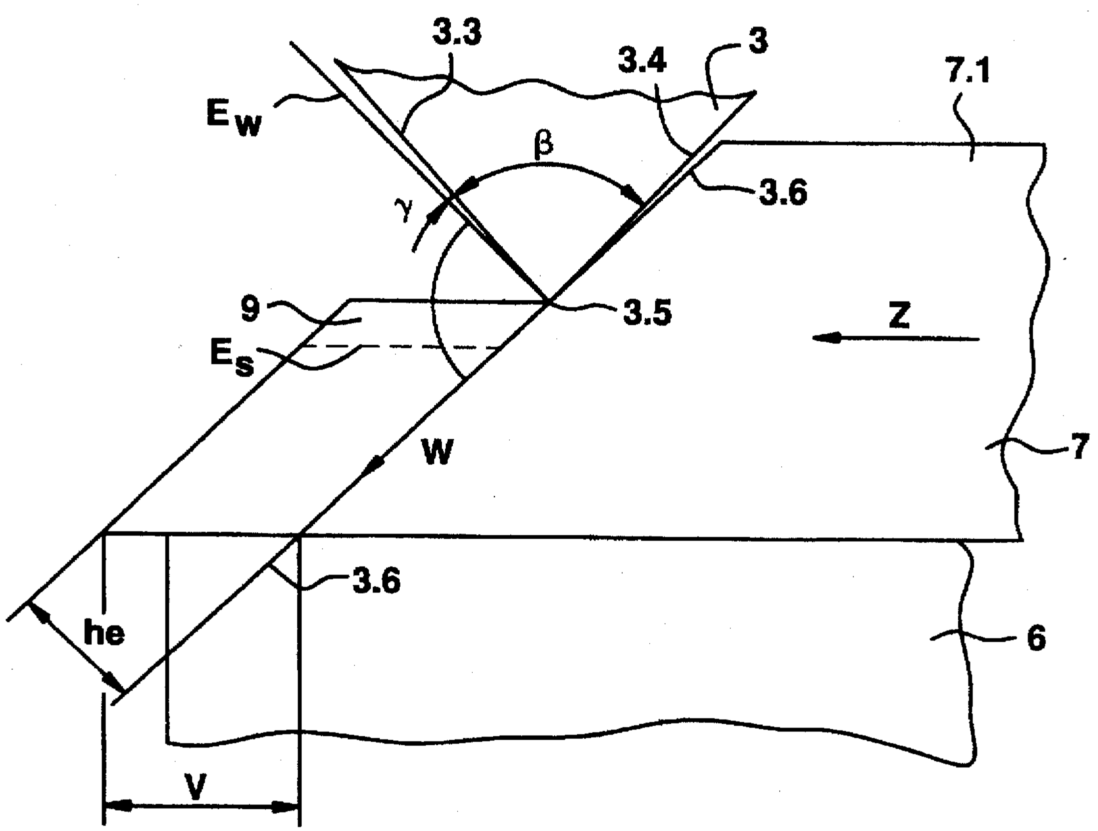
Figure 2:
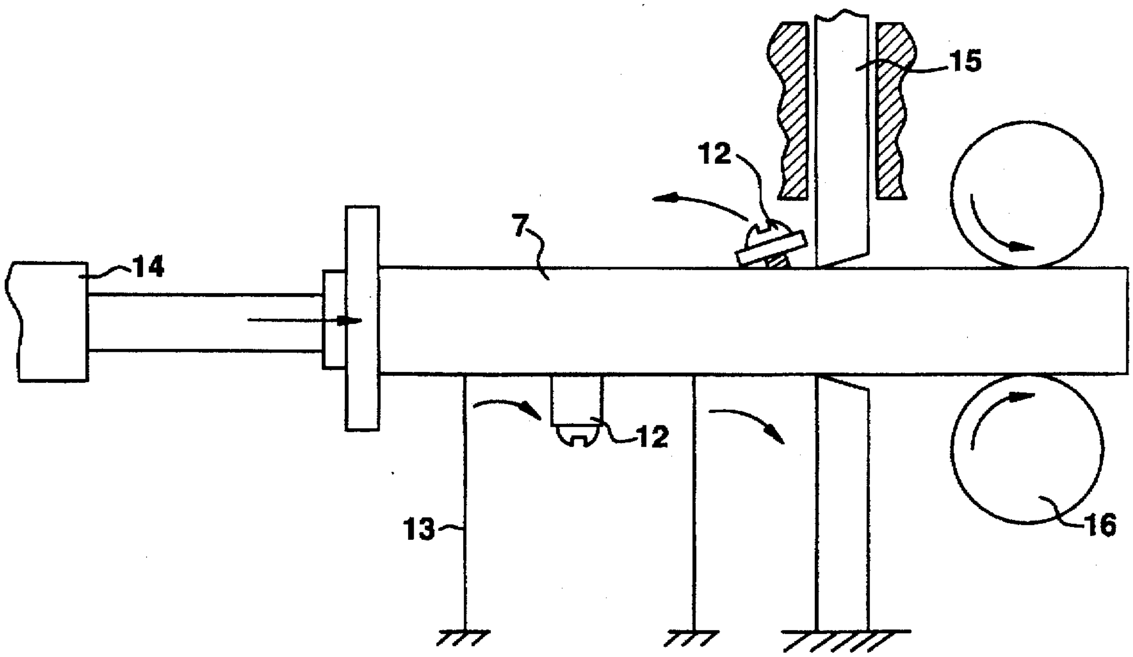
FIG. 2 shows an apparatus for the removal of fitting on the surface of the work piece.

Example 1: (See FIGS. 1, 1*a*, 1*b*, 2, 4, 5, 6, 9).

Panels and moldings from old furniture, in a thickness from 3 millimeters to 40 millimeters form the starting materials. These parts are first freed of fittings (12) such as locks, bars, joints or moldings which extend above the surface so that a trouble free comminution process can be achieved.

To this end, the old furniture parts are supported on spring supports (13) and are passed through a pair of knives (15) by a hydraulic cylinder (14). The knives have a wedge angle which is 85° and the forward cutting edge of which is perpendicular to the panel surface to be cleaned.

The distance between the knives is adjusted to match the corresponding panel thickness by means of a depth gauge and adjusting mechanism. If the old furniture piece has reached the transport rollers (16), it is further moved thereby. At the same time the working piston of hydraulic cylinders (14) retreats to its starting position. In this manner all projecting parts (12) are removed and fall to a conveyor for disposal.

The production of the platelets occurs on a double eccentric press (1) having a maximal pressing force of 600 MN, and an opening width of 80 millimeters and stroke speed of 1200 per minute. Instead of being equipped with common stamping or bending apparatus, the press is equipped with an 800 millimeter cutting/breaking tool (3: 3.1: 3.2) which has a symmetrical section and which has cutting edges 2 which are at right angle to another and which are 8 mm wide.

This cutting/breaking tool (3: 3.1: 3.2) is mounted on a rail guided work carrier (4) which moves, by way of a corresponding transmission (5), also axially from side to side during a working stroke.

A supporting plate (6) is mounted fixed to the machine tool table and it is 800 millimeter wide on which recyclable wood panels (7) of a thickness ranging from 3 millimeters to 40 millimeters and with a width up to 800 millimeters (such as old furniture parts of different formats) are advanced with an advancing mechanism (8) in steps of 15 millimeter in rhythm with the knife strokes. The step wise advance of the panel 7 occurs transverse to the motion of cutting/breaking tool (3).

During the downward stroke, the cutting/breaking tool (3) penetrates the panel 7 and that breaks off platelets (9) which are 15 millimeters wide and between 1.5 millimeters to 4 millimeters thick. If the old furniture is comprised of wood panels, thicker platelets (9) are produced. If the old furniture piece consists of a fiber panel of medium thickness, preferably thinner platelets (9) are formed with a length which corresponds to the corresponding width of the old furniture piece. The thus produced platelets (9) are then provided to a rapid impact machine and are there reduced to a median length of 40 millimeters.

Figure 4:
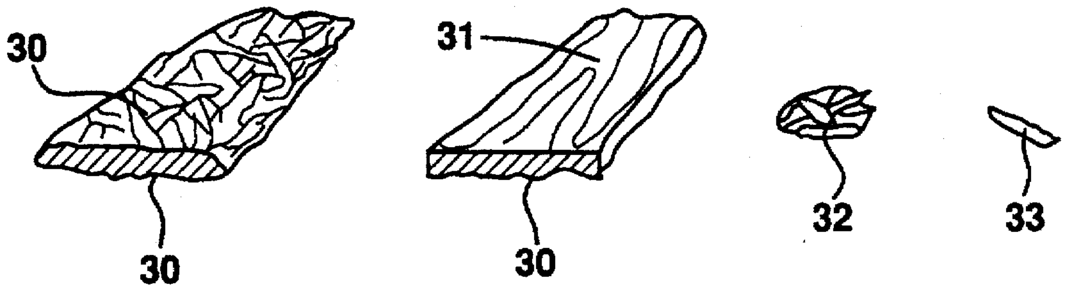
FIG. 4 shows the platelets and particles.
Figure 5:
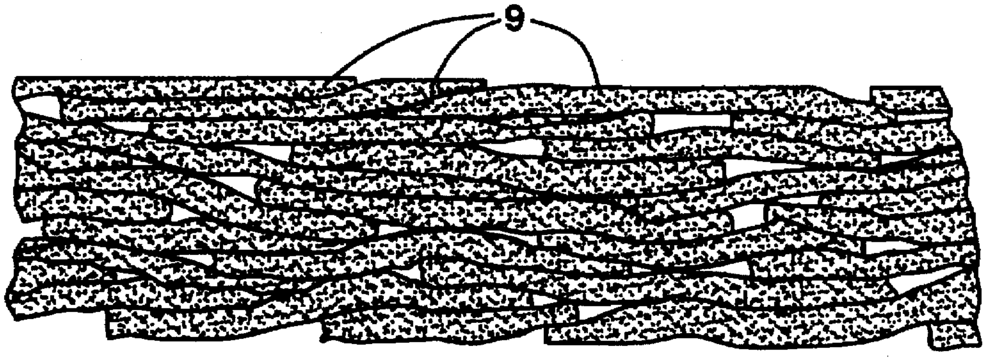
FIG. 5 shows the recycled wood product in accordance with the invention.
Figure 6:
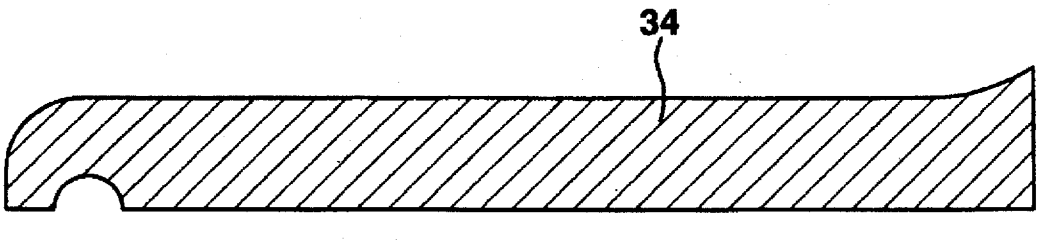
FIG. 6 shows a sectional view of a window frame.
Figure 7:
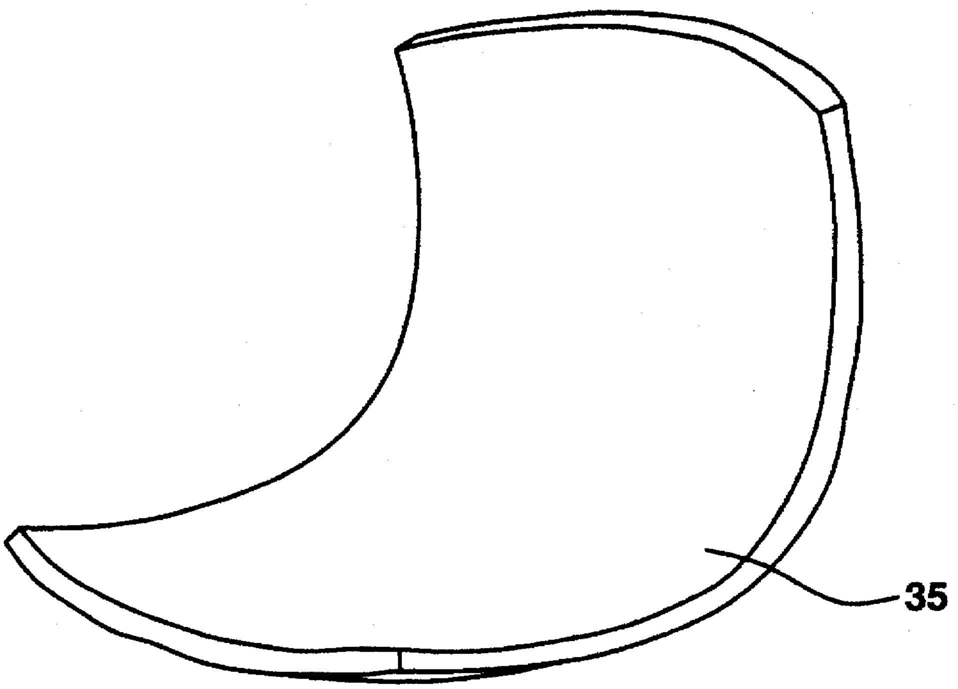
FIG. 7 shows a seat frame formed from the materials of the invention.
Figure 8:
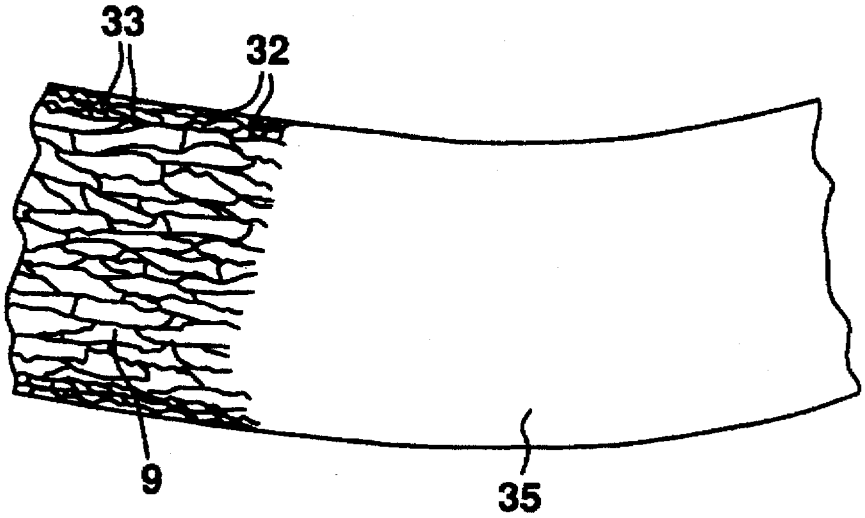
FIG. 8 shows a detail, in section, of FIG. 7.
Figure 9:
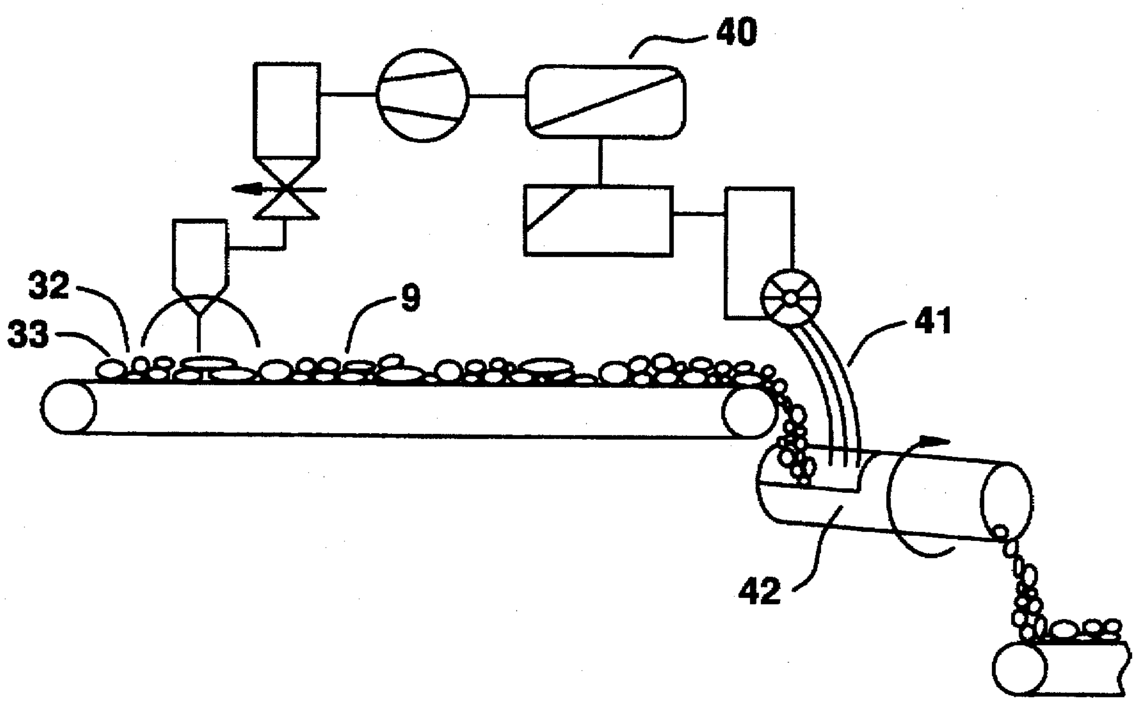
FIG. 9 shows a schematic diagram of a process in which an infra-red measuring element is used to control the addition of urea in a mixing drum.
Figure 10:
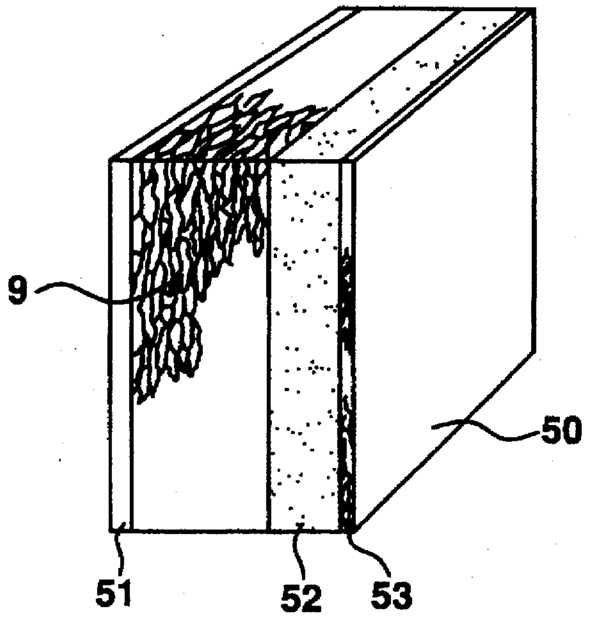
FIG. 10 shows a cross sectional view of a building element constructed by the use of the invention.

FIG. 4 shows a platelet from the middle region of a pressed panel in which the structure of the work piece is visible at the separating surfaces (30). Another platelet exhibits the surface (31) of the edges of a layered furniture piece utilized as the starting material.

Particles (32) and (33) are produced as break-off pieces from the platelets (9) and these particles are significantly smaller than the platelets (9) and they amount to about 3% to 4% of the starting volume of the recyclable wood panel that has been processed.

If a metal piece (10) is located within the old furniture part it is initially moved, by the penetration of the cutting/breaking tool, (3) in the direction toward the support structure (6), from within the surrounding panel or fibrous-panel material and it is eventually separated. When the cutting/breaking tool (3) has reached the support structure (6), it reverses direction and yields to a further advance of the old furniture piece; thereafter, the next separation process occurs.

In the vicinity of the cutting/breaking tool (3) is located a felt (11), soaked with a graphite solution, and the cutting/breaking tool (3) brushes the felt in the region of its upper reversing motion. Thus the cutting/breaking tool (3) is lubricated with a lubricant and the cutting forces are reduced. The lubricant spreads itself only over the edges of the platelets (9) so that no moistening of the large surfaces occurs which would could influence a subsequent glueing of the platelets (9).

Directly after the production of the platelets (9) their formaldehyde emission is measured with an infrared apparatus (40). The resulting measurement governs the addition of a 35% urea solution (41) in a mixing drum (42) so that the formaldehyde content of the finished recycled wood product lies under 6 milligrams per 100 grams.

Subsequently, a separation of the platelets (9) from the significantly smaller particles (32) and (33) follows in a known sifting process as well as separation from metal parts by way of a normal metal separator.

The thusly prepared platelets (9) are now introduced into a slowly rotating gluing drum and treated with a urea/formaldehyde resin (common to the production of wood panels) to a level of 3.5%. Thereafter, by way of a known scattering station, there is formed a one layered mat with a thickness of around 80 millimeters with is thereafter treated in a heated (to 180° C.) flat press and pressed into a recycled wood panel with a thickness of 35 millimeters and a raw density of 500 kg/m$^3$.

The panel consists, except for the added glue of 3.5% (the normal production of pressed panels requires about 10% glue) of about essentially 100% of old furniture materials. Since the otherwise conventional process for drying is eliminated, no drying energy is consumed.

The new, derived wood panel exhibits a bending strength of 1.10 N/mm$^2$ and can be used as a covering panel for concrete in high-rise construction or as a form in the construction of foundations.

In another application, the resulting derived wood panel can be given a final polishing and can be used as the insert for living room doors that are provided with a plywood cover.

In accordance with an advantageous variation, the described derived wood product panel is produced in a thickness of 120 millimeters. After sizing and the milling of grooves for surface connecting means—such as splines—the derived wood panel is layered on one side with a gypsum cover (51), on the opposite side by way of a polystyrene foam (52) and finally a rubber cement panel (53). The derived wood panel is additionally layered with a known fire retardant material.

The thusly produced element is suitable for the erection of prefabricated housing in lightweight construction.

The particles (32) and (33) are further processed in a fashion analogously to the platelets (9). However, the glue amount is about 7% and the achieved raw density is 900 kg/m$^3$. In one application, the particle-glue mixture is pressed into a window sill in one piece.

Embodiment Example 2

Figure 3:
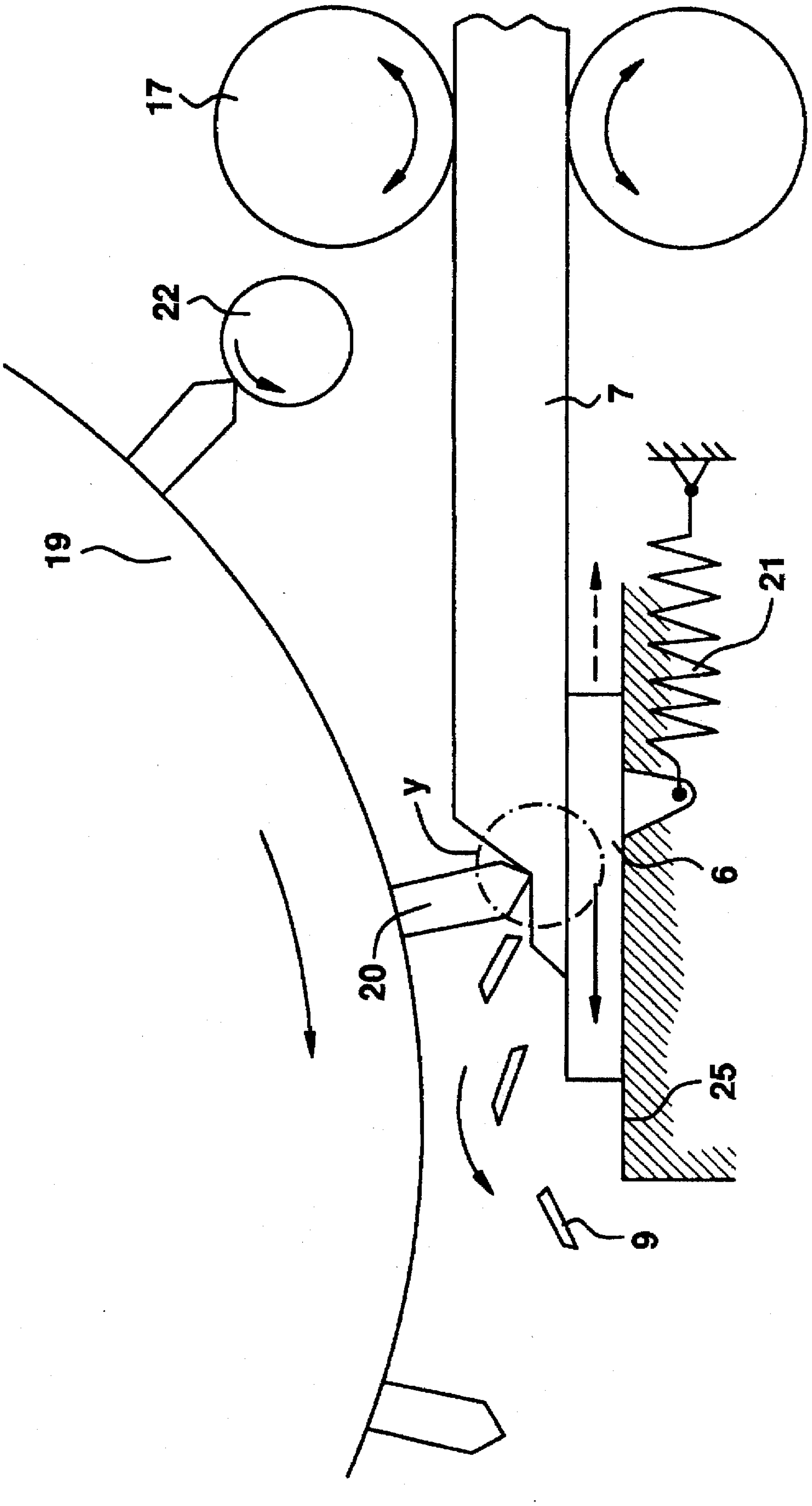
FIG. 3 shows a rotating work carrier with cutting and breaking tools and a support arrangement.
Figure 3A:
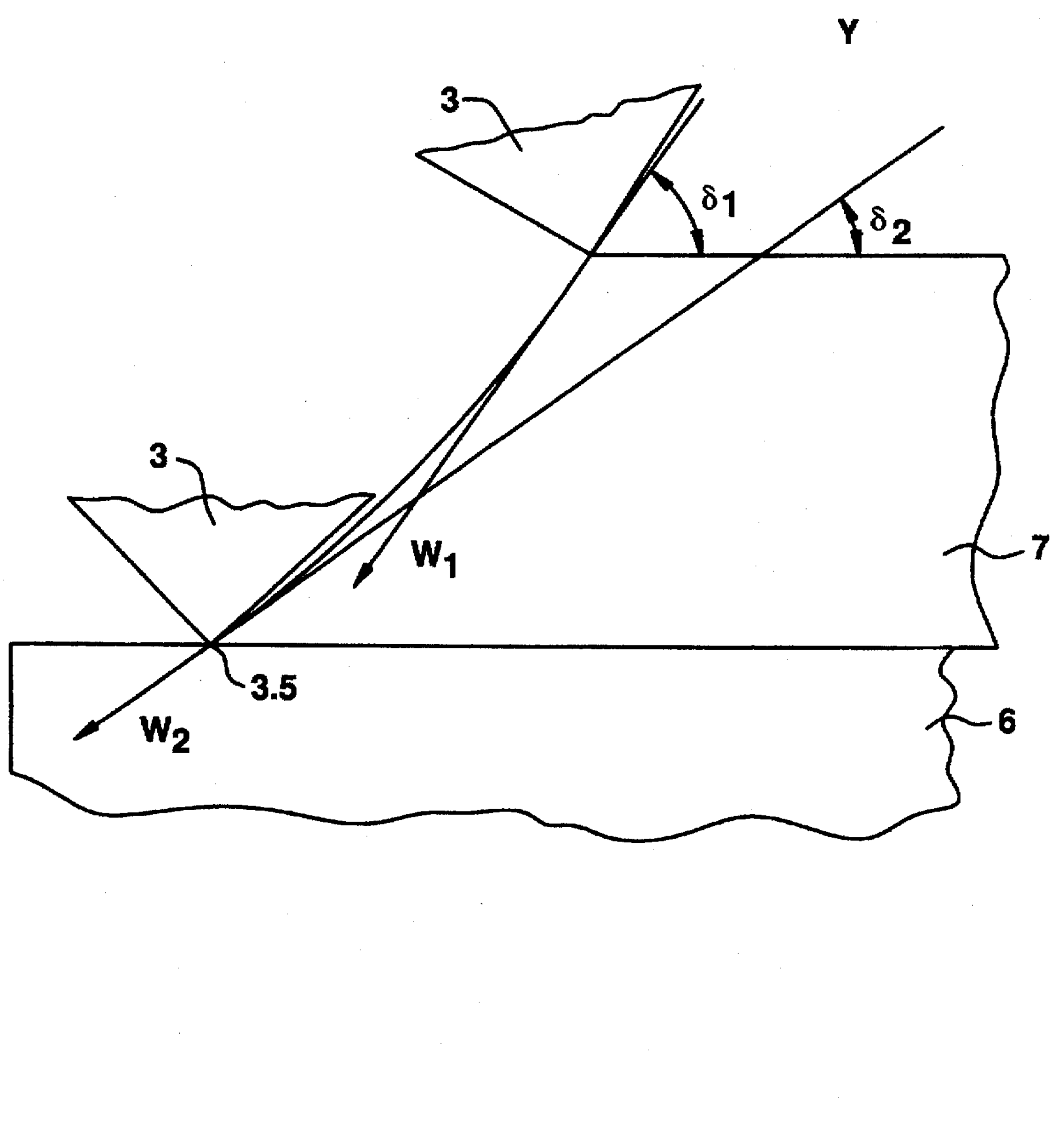

(See FIG. 3, **3*a*, 7, 8**)

In a fashion analogous to example 1, old furniture parts are moved through an advancing arrangement 17 on a movable support plate (6) which is movable in the advance direction and which has a width of 800 millimeters. A workpiece carrier (19) with a diameter of 900 millimeters carries 16 equally spaced radially arranged cutting/breaking tools (3) with the same dimensions as in example 1.

The workpiece carrier (19) is arranged with respect to the support plate (6) so that the knife edges touch the supporting plate in their ending position. The workpiece carrier (19) turns in the same direction as the upper transport roller of the advance mechanism (17) and rotates with speed of 80 revolutions per minute. At every penetration of the engaged cutter/breaking tool (3) into the old furniture part, in a fashion analogously to example 1, chips away platelets (9). Metal parts which may be present are reduced in size as previously described.

The changing work direction angle (δ) of 17.5° with respect to the old furniture piece has no significant affect on the cutting requirements. The support plate (6) moves with the cutting/breaking tool (3) where, as a result of the slanting development of the cutting surface, it moves with a lower velocity than the tangential velocity of the cutting/breaking tools (3). The work tool carrier (19) is provided with a roller (22) which moves synchronously with the work tool carrier (19) and which moistens the cutting/breaking tools (3) with a paraffin emulsion.

At the conclusion of the described cutting and breaking process the old furniture part is pulled back by the step-wise push arrangement (17) so that it is advanced 15 millimeters beyond the starting position at the commencement of the first cutting process. The supporting plate (16) moves independently, through the effects of the spring (21), back into the starting position. With the engagement of the next cutting and breaking tool (3) the described process repeats itself. The advantage of this variation with respect to the one described in example 1 lies in the high productivity achieved as a result of the utilization of continuously working, multiple cutting, rotating cutting and breaking tools.

The preparation and the further processing of the platelets (9) to a new recycled wood product occurs essentially as described in example 1. However the platelets (9) are arranged in the middle region and the resulting particles (32) and (33) are arranged in the edge region (cover layers) of the recycled wood product to be produced. In one application, a 16 millimeter thick part (35) is pressed, with a raw density of 680 kg/m$^3$, which can be utilized as the shell of a chair in the construction of furniture.

Industrial Utility

The new derived wood product can be used, in plate-like form or in a spatially formed embodiment especially as a construction element or insulation material, for packaging material or as an essential element in compound panels used in interior construction, and in the production of furniture.

What is claimed is:

1. A recycled wood article for use in furniture making, or interior construction, in the production of packing materials, in high rise or foundation construction, with a wall thickness between 5 mm and 1,000 mm wherein:

a) the recycled wood article has a median raw density of between 450 $kg/m^3$ to 1100 $kg/m^3$;

b) the recycled wood article is comprised of platelets i) with an average wall thickness between 1.0 mm and 8.0 mm;

ii) which exhibit a relationship between platelet width to platelet thickness of 3:1 to 10:1, iii) which exhibit a relationship of platelet length to platelet thickness of 3:1 to 200:1, iv) which have a median surface area of 1 $cm^2$ to 25 $cm^2$;

c) the platelets are comprised of recycled wood products;

d) the platelets are arranged between themselves i) in a generally overlapping manner, ii) oriented generally parallel to the surface of the article and, which are directly connected to another with glue between the contact surfaces of their touching borders.

2. Article according to claim 1 wherein:

e) the product comprises in addition to the platelets a supplement of up to 10% by mass of broken recycled wood product parts, wherein the dimensions of the recycled wood product parts are smaller than the platelets, and f) the broken recycled wood product parts are distributed within the product or on the surface thereof.

3. Process for the making of a recycled wood article defined by claim 1 wherein:

a) The recyclable wood product utilized as starting material is stripped of fitting parts, located on, and projecting above, the surface of the recyclable wood;

b) after step a), the recyclable wood product is comminuted along its entire width so that platelets are produced;

c) the platelets are suitably shortened to the desired platelet length;

d) the formaldehyde content of the platelets is determined;

e) the platelets are treated in accordance with requirements with a formaldehyde capturing substance;

f) the platelets are glued together;

g) the glued platelets are uniformly, or statistically, scattered on a carrier; and h) the glued platelets and the optionally added broken recyclable wood product parts which are produced, are bound together under pressure.

4. Process according to claim 3 characterized in that the removal of fitting parts projecting above the surface of the recyclable wood product happens simultaneously and on both sides over the entire width of the recyclable wood product where the recyclable wood product is passed through two wedge shaped tools cooperating along the surface of the recyclable wood product.

5. Process according to claim 3 wherein:

a) the comminution of the recyclable wood product for the production of platelets occurs by passing the recyclable wood product to be processed between a wedge shaped cutting/breaking tool which has a working width greater than, or equal to, the width of the recyclable wood product, and the recyclable wood product is guided by an equally wide support structure;

b) the cutting/breaking tool performs, in the comminuting process, a translating work motion with a working direction with an angular direction of between 35° to 65° with respect to the surface of the recyclable wood product and wherein the working motion is in the direction of the support structure until before contact with the support structure, and wherein the support structure, viewed in the advance direction of the recyclable wood product, projects at least 3 mm beyond the working plane described by the cutting edge of the cutting/breaking tool;

c) the cutting/breaking tool returns to its starting position after the complete penetration of the recyclable wood product;

d) the recyclable wood product is moved to advance and wherein the chipping depth, measured perpendicular to the work direction and to the cut surface, amounts to between 3 mm to 30 mm, wherein the wedge angle (β) of the cutting/breaking tool, measured between the chipping surface and the free surface amounts to between 55° to 95° in the cutting region which is in the plane perpendicular to the cutting edge and wherein the chipping angle (γ) at the cutting/breaking tool, measured between the chipping surface and the reference plane perpendicular to the work direction, amounts to between +35° to −10°.

6. Apparatus for the practice of the process of claim 5 wherein the apparatus comprises:

a machine tool with an oscillating work motion which includes a tool carrier for carrying at least one wedge shaped cutting/breaking tool having a wedge angle of between 55° to 95° and a working width greater than, or equal to, the width of the recyclable wood product a machine tool table having a support structure for supporting the recyclable wood product wherein the tool carrier is movable toward the support structure by a transmission, wherein the cutting/breaking tool performs a translating work motion with a working-direction angle of between 35° to 65° measured with respect to the surface of the recyclable wood product until before, touching the support structure, wherein the support structure projects at least 3 mm beyond the cutting plate described by the cutting edge of the cutting/breaking tool, wherein the chipping angle (γ), measured between the chipping surface of the cutting/breaking tool and the working plane, which is perpendicular to the work direction at the cutting/breaking tool, is adjustable between 35° and −10°, and wherein the depth of the chipping area is adjustable between 3 mm to 30 mm over a step-wise functioning work advance structure, the motion of which is synchronized with the oscillating motion of the cutting-breaking tool through a transmission.

7. Apparatus according to claim 6 wherein the cutting-breaking tool is comprised of several, laterally spaced, cutting wedge segments, mounted on a cutting wedge bar which moves in the direction of the work advance.

8. Apparatus for the practice of the process in accordance with claim 5, comprising:

a machine tool with a rotating tool carrier, on the periphery of which is at least one cutting-breaking tool having a wedge angle of between 65° to 95° and having a working width that is larger than, or equal to, the width of the recyclable wood product, the machine tool including a machine tool table having a movable support structure, movable in the advance direction, for supporting the recyclable wood product wherein the support structure projects at least 3 mm beyond the cutting plane described by the cutting edge of the cutting-breaking tool as viewed in the advance direction, wherein the cutting/breaking tool performs a separation process in a circumferential motion towards the support structure with a changing work direction at a changing work direction angle of between 35° to 65° with respect to the surface of the recyclable wood product until, before, touching the support structure, wherein the circumferential tool motion is combined with an advancing straight line motion of the movable supporting structure that has the same sense, and is synchronous with, the cutting-breaking tool, the motion being synchronized with a transmission, wherein the recyclable wood product, after it has been penetrated, is moved against the direction of advance, wherein the movement against the direction of advance is dependent on the path of the cutting edge of the cutting-breaking tool with respect to the chosen advance amount in the work advance direction, wherein the support structure is moved step wise in the work advance direction, and, after completion of the cutting process, is moved back to its staring position, wherein the cutting edges of the cutting-breaking tools are so spaced around the circumference of the tool carrier that only one cutting edge engages the recyclable wood product, wherein the chipping angle ($\gamma$), measured between the chipping surface (33) of the cutting-breaking tool, and the work plane perpendicular to the working direction at the cutting-breaking tool is adjustable between +35° and −10°, and wherein the depth of the chipping area is adjustable from 3 mm to 30 mm.

9. Process according to claim 3 wherein the shortening of the platelets occurs through sawing.

10. Process according to claim 3 wherein the shortening of the platelets occurs through cutting.

11. Process according to claim 3 wherein the shortening of the platelets occurs through breaking.

12. Process according to claim 3 wherein the shortening of the platelets occurs through crushing machines.

13. Process according to claim 3 wherein the shortening of the platelets occurs through drums.

14. A recycled wood article according to claim 1 which includes an additional material placed on the surface thereof, the materials including materials consisting of the group of wood fiber sheets, pressed wood sheets, fiberglass reinforced synthetic material, sheets, plywood sheets, gypsum sheets, insulation sheets and aluminum sheets.

* * * * *